United States Patent
Balz et al.

(10) Patent No.: US 7,016,426 B1
(45) Date of Patent: Mar. 21, 2006

(54) METHOD FOR DETERMINING THE AMPLITUDE IMBALANCE AT THE RECEIVING END AND QUADRATURE ERROR IN A MULTI-CARRIER SYSTEM

(75) Inventors: Christoph Balz, Munich (DE); Martin Hofmeister, Munich (DE)

(73) Assignee: Rohde & Schwarz GmbH, Munich (DE)

( * ) Notice: Subject to any disclaimer, the term of this patent is extended or adjusted under 35 U.S.C. 154(b) by 808 days.

(21) Appl. No.: 10/110,124

(22) PCT Filed: Sep. 4, 2000

(86) PCT No.: PCT/EP00/08623

§ 371 (c)(1),
(2), (4) Date: Apr. 6, 2002

(87) PCT Pub. No.: WO01/26317

PCT Pub. Date: Apr. 12, 2001

(30) Foreign Application Priority Data

Oct. 7, 1999 (DE) ................................ 199 48 383

(51) Int. Cl.
*H04L 23/02* (2006.01)
(52) U.S. Cl. ...................... 375/261; 375/316; 370/207; 332/103
(58) Field of Classification Search ............... 375/261, 375/344, 260, 316, 326; 370/207; 332/103
See application file for complete search history.

(56) References Cited

U.S. PATENT DOCUMENTS

| 5,233,479 | A | 8/1993 | Nakatsu et al. |
| 5,471,508 | A | 11/1995 | Koslov |
| 6,320,917 | B1 * | 11/2001 | Stott et al. ................... 375/344 |
| 6,470,030 | B1 * | 10/2002 | Park et al. ................... 370/480 |
| 6,628,730 | B1 * | 9/2003 | Stott et al. ................... 375/344 |

FOREIGN PATENT DOCUMENTS

| EP | 0 324 581 | 1/1989 |
| WO | WO 97/27695 | 1/1997 |

OTHER PUBLICATIONS

Kim Y, et al.: "A New Fast Symbol Timing Recovery Algorithm for OFDM Systems", IEEE Transactions on a Comsumer Electronics, IEEE Inc. New York, US vol. 44, No. 3, Aug. 1998, pp. 1134-1141.

* cited by examiner

*Primary Examiner*—Mohammed Ghayour
*Assistant Examiner*—L. Malek
(74) *Attorney, Agent, or Firm*—Lewis, Rice & Fingersh, L.C.

(57) ABSTRACT

The aim of the invention is to determine the user data constellation of a multi-carrier signal at the receiving end. Said signal is QAM modulated in the 2K mode according to the DVB-T standard and is provided with a central carrier that is situated I the centre of the individual carriers and is temporarily modulated with user data and temporarily represents a distributed pilot. To resolve the aim of the invention, the appearance frequency of all I/Q values pertaining to the portion of user data belonging to the central carrier is detected and the centre of said user data constellation is then detected.

10 Claims, 3 Drawing Sheets

METHOD FOR DETERMINING THE AMPLITUDE IMBALANCE AT THE RECEIVING END AND QUADRATURE ERROR IN A MULTI-CARRIER SYSTEM

CROSS-REFERENCE TO RELATED APPLICATION(S)

This application is the national phase of PCT application PCT/EP00/08623, filed on Sep. 4, 2000, which claims priority to the German application 19948383.3, filed on Oct. 7, 1999.

BACKGROUND OF THE INVENTION

The invention relates to a method for the receiver-end determination of the payload constellation of a multi-carrier signal that is QAM modulated in the 2K mode according to the DVB-T standard. The co-called DVB-T standard describes a multi-carrier signal whose individual carriers are QAM-modulated, for example QPSK-, 16 QAM- or 64 QAM-modulated, with the payload. The number of the individual carriers used and enumerated by k depends on the mode of the Fourier transform (FFT) used. In the 2K mode, k=(0 . . . 1704).

SUMMARY OF THE INVENTION

An object of the invention is to determine the user data constellation of a multi-carrier signal at the receiving end. Said signal is QAM modulated in the 2K mode according to the DVB-T standard and is provided with a central carrier that is situated in the centre of the individual carriers and is temporarily modulated with user data and temporarily represents a distributed pilot. To resolve this object of the invention, the appearance frequency of all I/Q values pertaining to the portion of user data belonging to the central carrier is detected and the centre of said user data constellation is then detected.

DETAILED DESCRIPTION OF PREFERRED EMBODIMENTS

Figure 1:
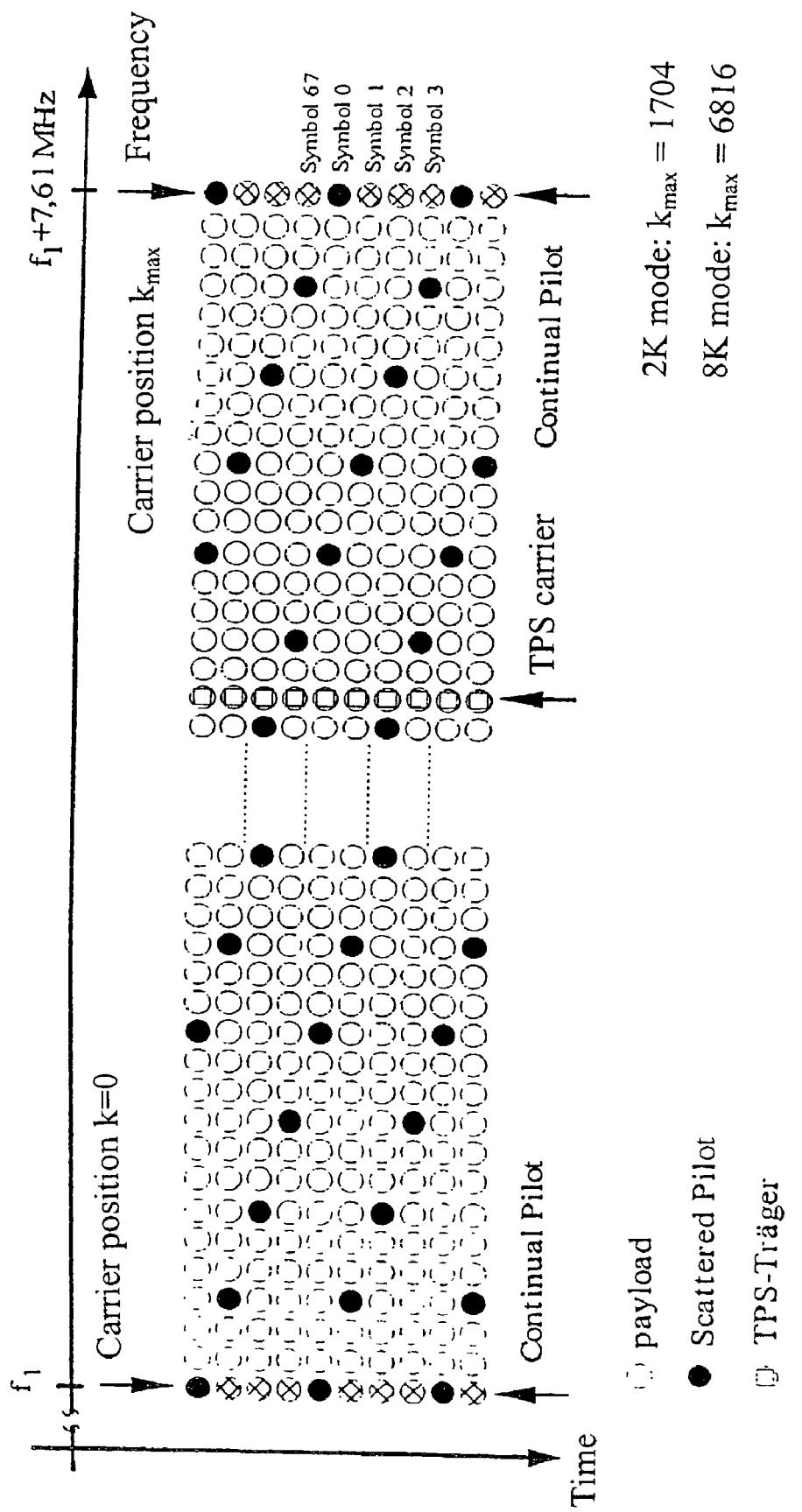
FIG. 1 shows a representation of the totality of all the individual carriers transmitted within a fixed time range within an embodiment.
Figure 2:
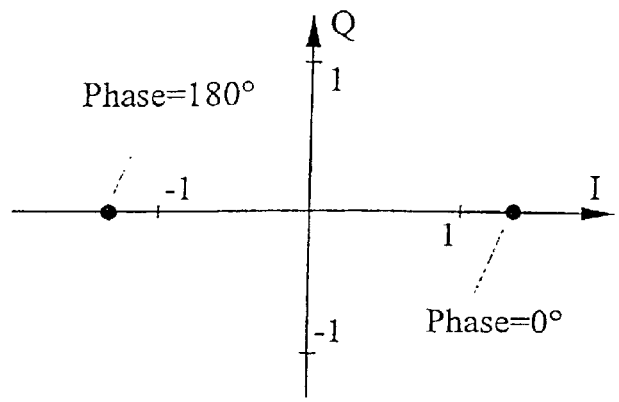
FIG. 2 provides a representation of numerous individual carriers transmitted with increased amplitude and having a fixed phase of 0° or 180°.

The totality of all the individual carriers transmitted within a fixed time range is denoted as a symbol, as shown in FIG. 1. Within said carrier domain, some of the carriers are 2PSK-modulated with additional items of information about the FFT mode, the QAM order etc. used and said carriers are denoted as TPS (transmission parameter signaling) carriers. In addition, numerous individual carriers that are transmitted with increased amplitude and have a fixed phase of 0° or 180° in accordance with FIG. 2 and are denoted as continual pilots are unmodulated. A further type of pilot is denoted as scattered pilots and these are likewise transmitted with increased amplitude and a fixed phase of 0° or 180° and are uniformly distributed over the carrier domain and occur at varying positions within said carrier domain from one symbol to the next. A receiving-end channel correction of a disturbed DVB-T signal is performed by means of interpolation along the frequency axis and time axis with the aid of said scattered pilots. Various transmission parameters can be determined from the constellations of on or more QAM-modulated individual carriers.

Individual carriers that intermittently contain a scattered pilot are modulated with payload for 75% of the time on the basis of the established standard and they represent a pilot for the remaining 25% of the time. In the channel correction, all the received pilot signals deviating from the ideal position in the I/Q plane are multiplied by a complex factor in such a way that the position of the pilot signal in the I/Q plane coincides with its ideal position. All the payload signals that may be situated on the same carrier are multiplied by the same factor.

Figure 3:
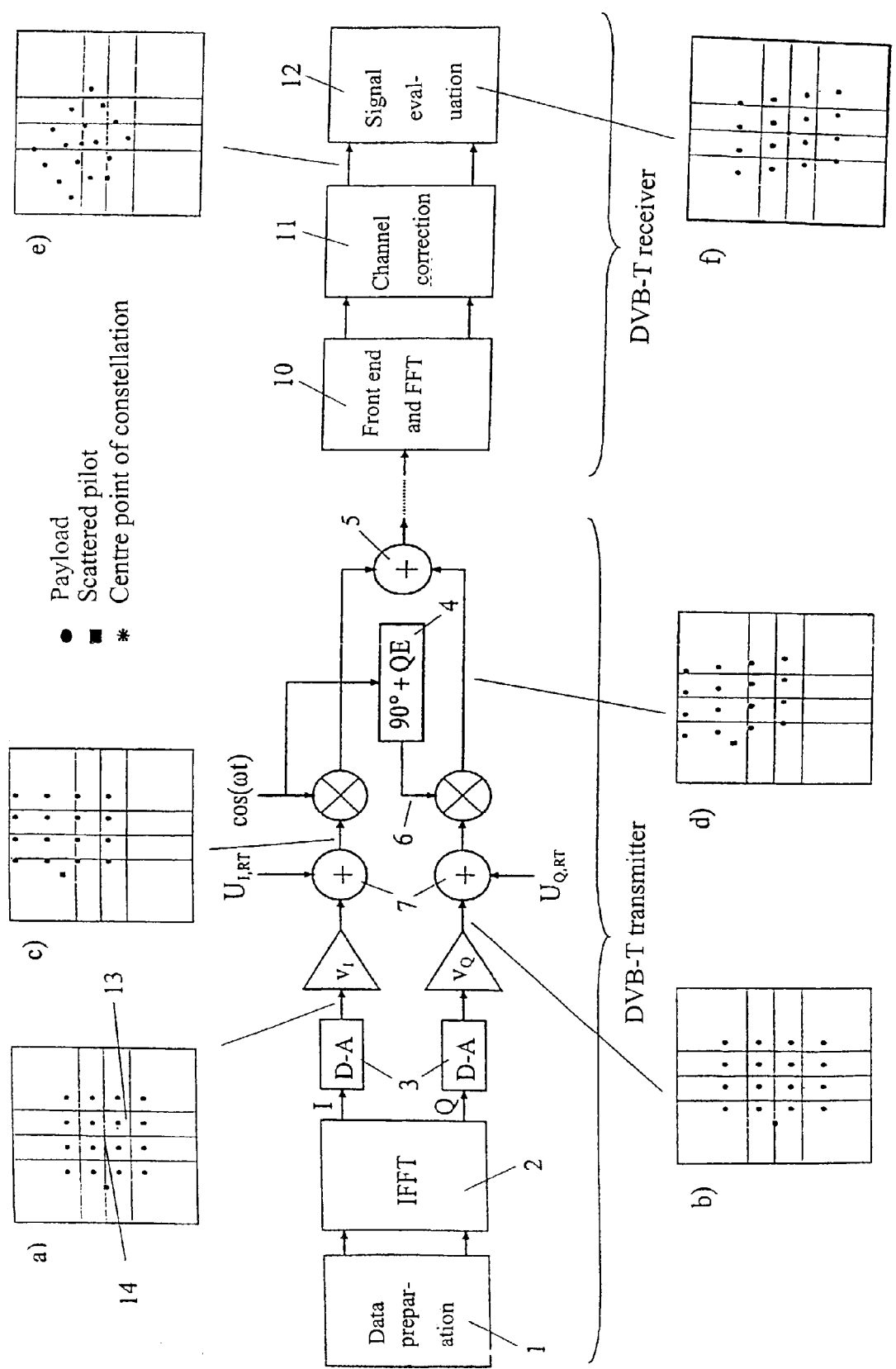
FIG. 3 shows an embodiment of the basic structure of a transmitter/receiver path of a digital video broadcast (DVB) system operating in the 2K mode according to the DVB-T standard.

FIG. 3 shows the basic structure of a transmitter/receiver path of a digital video broadcast (DVB) system operating in the 2K mode according to the DVB-T standard. In a data preparation stage 1, the digital video signals to be transmitted are prepared in the frequency domain and then converted into the time domain by inverse Fourier transform (IFFT). After digitization in A-D converters 3 and amplification in amplifiers by the gain factors $v_I$ and $v_Q$, the I- and Q-components thus generated are fed to a quadrature mixer 6 in which they are up-converted with the 90° mutually phase-shifted components of a carrier signal 4 to the desired output frequency and are combined again in an adder 5 and then emitted.

Figure 4:
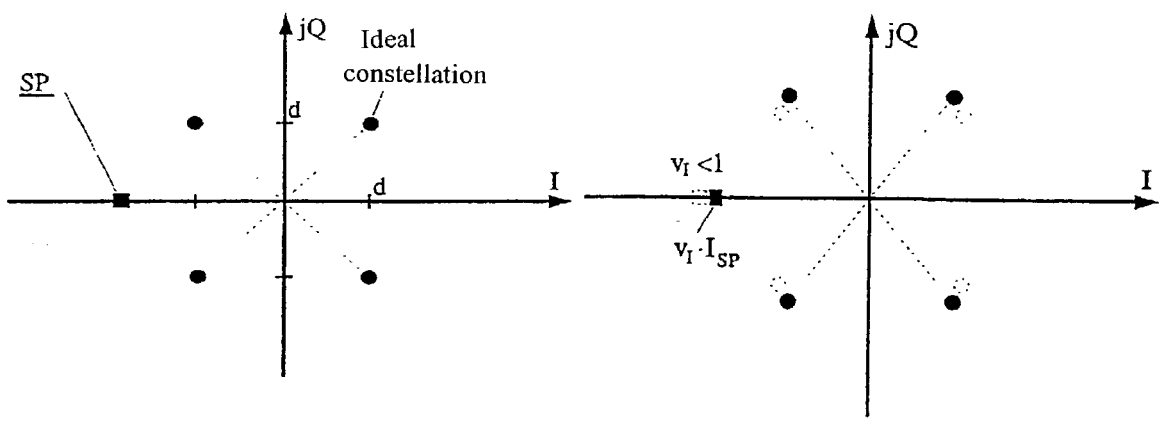
FIG. 4 provides a representation of how in an embodiment the received scattered pilots are corrected in such a way that they assume the ideal position in the I/Q plane at the receiving end.

In the receiver, a back-conversion of the received input signal from the time domain into the frequency domain takes place again in the input stage 10 by means of FFT, and then, in a correction stage 11, the channel correction described is performed with the aid of the scattered pilots, i.e. the received scattered pilots are corrected in such a way that they assume the ideal position in the I/Q plane at the receiving end, as is shown in FIG. 4. In an adjoining signal evaluation device 12, the received video signals are processed further.

FIG. 3 shows the various possibilities for influencing amplitude imbalance, quadrature error and residual carrier that may occur in such a DVB-T transmitter. FIG. 3a shows the ideal payload constellation of an individual carrier, for example the central carrier. The individual I/Q values of the payload are each situated at their specified positions in the decision fields 13 shown and, specifically, symmetrically with respect to the centre point 14 of the I/Q plane (co-ordinate centre point).

If the two amplifiers $v_I$ and $v_Q$ do not have exactly equal gain, an amplitude imbalance is generated that manifests itself in a shift of the payload position within the decision fields in accordance with FIG. 3b.

In the I- and Q-branches, distributing direct-voltage components may also occur in addition, as is indicated in FIG. 3 by the adding stages 7 and the voltages $U_{I,RT}$ and $U_{Q,RT}$. These result in a disturbing residual carrier that generates a shift in the payload constellation, as shown in FIG. 3c.

A quadrature error (the two carriers mutually phase-shifted by 90° of the quadrature mixer are not shifted exactly 90°) combined with the amplifier and a disturbing direct-voltage component that manifests itself as residual carrier produces a payload constellation according to FIG. 3d, in which the entire payload constellation is not only shifted and twisted, but in which the scattered pilot also no longer has its ideal position.

If a disturbed payload constellation in accordance with FIG. 3d is transmitted to the receiver, the scattered pilot is first returned again to an ideal position by the known channel correction 11, as shown in FIG. 3e. The remaining payload is still twisted and shifted.

The impairments mentioned of the payload constellation in accordance with FIG. 3 also apply to the central carrier that is situated in the base band at the frequency f=0. A residual carrier due to direct-voltage components at the transmitter end therefore causes a shift in the constellation especially of the central carrier. Since said central carrier is modulated with payload in the 2K mode and intermittently represents a scattered pilot (phase=180°), a stretched or compressed and shifted or rotated constellation of the payload also of the central carrier occurs after a channel correction. This effect can be so great that individual I/Q values or a plurality of I/Q values leave their associated decision fields.

The object of the invention is to disclose a method with which, firstly, such impaired payload constellations can be determined at the receiving end and, consequently, the residual-carrier power can be calculated and/or the demodulation properties of the receiver can be improved.

This object is achieved proceeding from a method according to the preamble of the main claim by its characterizing features. Advantageous developments emerge, on the one hand, for the residual-carrier power calculation or demodulation improvement, respectively, from the subclaims.

The residual-carrier power can be calculated using the method according to the invention by simply evaluating the payload of the central carrier and, specifically, with account being taken of the effect due to the amplitude imbalance and the quadrature error. In addition, the alterations generated by the transmitter-end errors can be compensated for again by simply twisting and compressing or stretching the payload constellation determined and the demodulation properties can thus be improved.

The invention is explained in greater detail below by reference to further diagrammatic drawings based on an exemplary embodiment.

Figure 5:
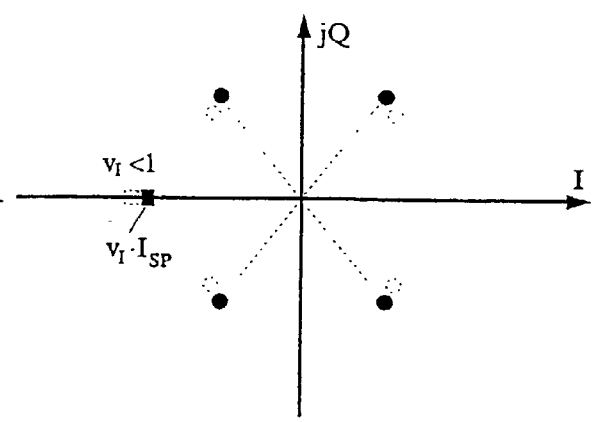
FIG. 5 shows a representation of the alteration of an ideal constellation and position, as shown in FIG. 4, under the influence of an amplitude imbalance.

FIG. 4 shows the ideal payload constellation of the QPSK-modulated central carrier in the 2K mode and the ideal position of the scattered pilot SP with 180° phase shift. FIG. 5 shows the alteration of said ideal constellation and position under the influence of an amplitude imbalance if, for example, the one amplifier has a gain of $v_I$=0.9 in the I branch and $V_Q$=1.2 in the Q branch. The ideal position is shown by $I_{SP}$ in FIG. 5.

Figure 6:
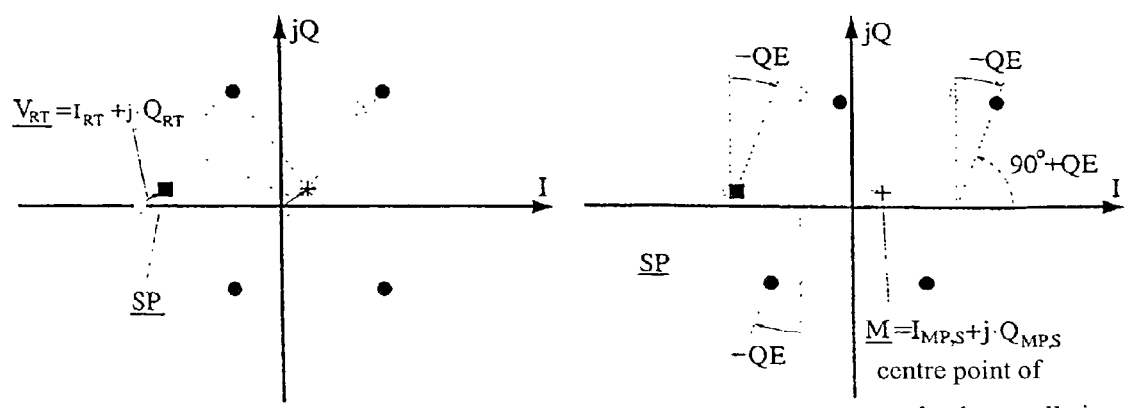
FIG. 6 provides a representation of an additional shift from an ideal constellation and position achieved if a residual carrier having the in-phase component $I_{RT}$ and the quadrature-phase component $Q_{RT}$ is also added.

If a residual carrier having the in-phase component $I_{RT}$ and the quadrature-phase component $Q_{RT}$ is also added, an additional shift is also achieved in accordance with FIG. 6.

Figure 7:
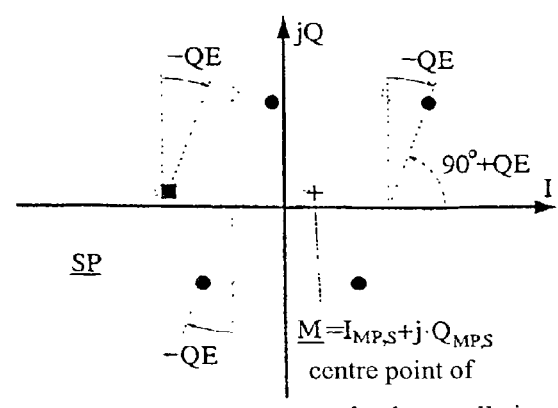
FIG. 7 shows the constellation and position of the scattered pilot SP under the influence of an amplitude imbalance ($\downarrow v_I$=0.9, $\downarrow v_Q$=1.2) and also having a residual carrier with $I_{RT}$=0.3 d and $Q_{RT}$=0.4 d and an additional quadrature error QE=20°, where d is the distance from the centre point of a decision field to its periphery.

Finally, FIG. 7 shows the constellation and position of the scattered pilot SP under the influence of an amplitude imbalance ($\downarrow v_I$=0.9, $\downarrow v_Q$=1.2) and also having a residual carrier with $I_{RT}$=0.3 d and $Q_{RT}$=0.4 d and an additional quadrature error QE=20°, where d is the distance from the centre point of a decision field to its periphery. As a result of the interaction of said errors, the payload constellation and the position of the scattered pilot in accordance with FIG. 7 are shifted and twisted and the centre point of the payload constellation is also correspondingly shifted.

These shifts are determined at the receiving end in accordance with the invention. For this purpose, in a first method step, the frequencies of occurrence of all the I/Q values of the payload of the central carrier are first determined and stored in a two-dimensional array in the signal evaluation device 12. The centre-point M of the payload constellation is then determined therefrom, as shown in FIG. 7. For this purpose, the I-component of the centre point is calculated by a summation, weighted with the instantaneous I-value in each case, of the frequencies of occurrence and a subsequent division by the sum of all the frequencies of occurrence stored in the array. The Q-component of the centre point is determined analogously. For this purpose, a large number of I/Q measured values is a prerequisite.

As a result of the channel correction 11, known per se, in the receiver, the scattered pilot already has its ideal position. Consequently, in a second method step, the entire constellation of payload of the central carrier can be rotated and stretched or compressed in such a way that the centre point of the consequently newly produced payload constellation coincides with the co-ordinate original of the I/Q plane. Under these circumstances, the stretching and rotation centre is the previously already corrected ideal position of the scattered pilot.

This second method step ensures that, if possible, all the I/Q values are again situated within their decision fields 13. In this way, the demodulation can be improved at the receiving end, and this manifests itself in a higher transmission reliability.

The amplitude-imbalance error can also easily be calculated. For this purpose a centre point in the decision field is calculated in each case for every decision field with the aid of the frequencies of occurrence of the I/Q values within the decision field. Regression lines can be drawn through said centre points of all adjacent decision fields situated respectively on a horizontal and vertical line. The amplitude-imbalance error due to the transmitter can be calculated from the ratio of the mean spacings of the straight lines situated in the horizontal and vertical direction. The quadrature error can be calculated similarly and, specifically, from the difference in the mean slope of the straight lines situated in the horizontal and vertical direction.

In addition, the residual-carrier amplitude at the receiver end can easily be calculated from the determination of the centre point of the payload constellation of the central carrier taking account of the amplitude-imbalance error and quadrature error.

The in-phase and quadrature-phase components of the centre point $I_{MP,S}$+$j \cdot Q_{MP,S}$ of the transmitted constellation, which is influenced by amplitude imbalance ($v_I$ and $v_Q$), a residual carrier $I_{RT}+j \cdot Q_{RT}$ and a quadrature error QE can be determined as follows:

$$I_{MP,S}=I_{RT}+Q_{RT}\cdot\sin(-QE)=I_{RT}-Q_{RT}\cdot\sin(QE) \; Q_{MP,S}=Q_{RT}\cdot\cos(QE) \quad (A.1)$$

The amplitude imbalance does not influence the position of the constellation centre point, for which reason the factors $v_I$ and $v_Q$ do not appear in the equations. Correspondingly, the position of the transmitted scattered pilot $I_{SP,S}+j \cdot Q_{SP,S}$ ($I_{SP}$: ideal in-phase value of the scattered pilot) is given under these influences by:

$$I_{SP,S}=v_I \cdot I_{SP}+I_{RT}-Q_{RT}\cdot\sin(QE) \; Q_{SP,S}=Q_{RT}\cdot\cos(QE) \quad (A.2)$$

The relationships (A.1) and (A.2) show that:

$$I_{SP,S}=I_{MP,S}+V_I \cdot I_{SP} \; Q_{SP,S}=Q_{MP,S} \quad (A.3)$$

In the channel correction, $I_{SP,S}+j \cdot Q_{SP,S}$ is imaged by multiplication by $$\frac{I_{SP}}{I_{SP,S}+j \cdot Q_{SP,S}}$$

on its ideal position $I_{SP}$. Precisely the same procedure is also adopted with all the points in the constellation of the payload. Consequently, the centre point of the constellation $MP=I_{MP}+j \cdot Q_{MP}$ is also given by:

$$\underline{MP} = (I_{MP,S}+j \cdot Q_{MP,S}) \cdot \frac{I_{SP}}{I_{SP,S}+j \cdot Q_{SP,S}} \Rightarrow I_{MP}+j \cdot Q_{MP} =$$

$$(I_{MP,S}+j \cdot Q_{MP,S}) \cdot \frac{I_{SP}}{(I_{MP,S}+j \cdot Q_{MP,S})+v_1 \cdot I_{SP}}$$

Rearrangements and separation into real and imaginary parts yield an equation system:

$$I_{SP} \cdot I_{MP,S}=I_{MP,S} \cdot I_{MP}-Q_{MP,S} \cdot Q_{MP}+V_I \cdot I_{MP} \cdot I_{SP} \quad (1)$$

$$I_{SP} \cdot Q_{MP,S}=Q_{MP,S} \cdot I_{MP}+I_{MP,S} \cdot Q_{MP}+v_I \cdot I_{SP} \cdot Q_{MP} \quad (2)$$

Substitution of the two relationships from (A.1) gives:

$$I_{SP} \cdot [I_{RT}-Q_{RT}\cdot\sin(QE)]=I_{MP}\cdot[I_{RT}-Q_{RT}\cdot\sin(QE)]- Q_{MP}\cdot Q_{RT}\cdot\cos(QE)+v_I\cdot I_{MP}\cdot I_{SP} \quad (1)$$

$$I_{SP} \cdot Q_{RT} \cdot \cos(QE)=I_{MP}\cdot Q_{RT}\cdot\cos(QE)+Q_{MP}\cdot[I_{RT}- Q_{RT}\cdot\sin(QE)]+v_I\cdot I_{SP}\cdot Q_{MP} \quad (2)$$

Solution of equation (2) for $Q_{RT}$:

$$Q_{RT} = \frac{I_{RT} \cdot Q_{MP} + v_1 \cdot I_{SP} \cdot Q_{MP}}{I_{SP}\cdot\cos(QE) - I_{MP}\cdot\cos(QE) + Q_{MP}\cdot\sin(QE)} \quad (A.4)$$

Substitution of (A.4) in equation (1) and solution for $I_{RT}$ yields:

$$I_{RT} = v_1 \cdot I_{SP} \cdot \frac{[I_{MP}\cdot I_{SP} - I_{MP}^2 - Q_{MP}^2]\cdot \cos(QE) + I_{SP}\cdot Q_{MP}\cdot\sin(QE)}{[(I_{SP}-I_{MP})^2 + Q_{MP}^2]\cdot\cos(QE)} \quad (A.5)$$

This result is substituted in relationship (A.4) and simplified:

$$Q_{RT} = v_1 \cdot I_{SP}^2 \cdot \frac{Q_{MP}}{[(I_{SP}-I_{MP})^2 + Q_{MP}^2]\cdot\cos(QE)} \quad (A.6)$$

where
$I_{RT}$: In-phase component of the residual-carrier amplitude,
$Q_{RT}$: Quadrature-phase component of the residual-carrier amplitude,
$v_I$: Gain of the in-phase component in the transmitter (amplitude imbalance),
QE: Quadrature error (including sign),
$I_{SP}$: In-phase component of the ideal scattered pilot,
$I_{MP}$: In-phase component of the constellation centre point after the channel correction,
$Q_{MP}$: Quadrature-phase component of the constellation centre point after channel correction.

The invention claimed is:

1. Method for the receiver-end determination of the payload constellation of a multi-carrier signal that is QAM modulated in the 2K mode according to the DVB-T standard and that has a central carrier that is situated in the centre of the individual carriers and that is intermittently modulated with payload and intermittently represents a scattered pilot, characterized in that the frequency of occurrence of all the I/Q values of the payload component of the central carrier is determined and the centre point of said payload constellation is then determined.

2. Method according to claim 1, characterized in that, to determine the centre point of the payload constellation of the central carrier, the respective instantaneous I- or Q-value weighted with the frequency of occurrence is summed and is then divided by the sum of all the frequencies of occurrence.

3. Method according to claim 1 or 2, characterized in that the power of the residual carrier transmitted by the transmitter is calculated from the calculated centre point of the payload constellation and the co-ordinate origin of the I/Q plane.

4. Method according to claim 1 or 2, characterized in that the payload constellation determined with its centre point is rotated and compressed or stretched around the ideal position of the scattered pilot in such a way that the centre point of the new payload constellation thus obtained coincides with the co-ordinate origin of the I/Q plane.

5. Method according to claim 1 or claim 2, characterized in that a centre point in the decision field is calculated in each case for every decision field of the I/Q values of the payload of the central carrier with the aid of the frequencies of occurrence of said I/Q values within the decision field, straight lines are drawn through said centre points of adjacent decision fields lying respectively on a horizontal or vertical line and the respective amplitude-imbalance error due to the transmitter is calculated from the ratio of the mean spacings of said horizontal and vertical straight lines.

6. Method according to claim 5, characterized in that the quadrature error produced at the transmitter end is calculated from the difference in the mean slopes of the horizontal and vertical straight lines.

7. Method according to claim 3, characterized in that a centre point in the decision field is calculated in each case for every decision field of the I/Q values of the payload of the central carrier with the aid of the frequencies of occurrence of said I/Q values within the decision field, straight lines are drawn through said centre points of adjacent decision fields lying respectively on a horizontal or vertical line and the respective amplitude-imbalance error due to the transmitter is calculated from the ratio of the mean spacings of said horizontal and vertical straight lines.

8. Method according to claim 7, characterized in that the quadrature error produced at the transmitter end is calculated from the difference in the mean slopes of the horizontal and vertical straight lines.

9. Method according to claim 4, characterized in that a centre point in the decision field is calculated in each case for every decision field of the I/Q values of the payload of the central carrier with the aid of the frequencies of occurrence of said I/Q values within the decision field, straight lines are drawn through said centre points of adjacent decision fields lying respectively on a horizontal or vertical line and the respective amplitude-imbalance error due to the transmitter is calculated from the ratio of the mean spacings of said horizontal and vertical straight lines.

10. Method according to claim 9, characterized in that the quadrature error produced at the transmitter end is calculated from the difference in the mean slopes of the horizontal and vertical straight lines.

* * * * *